US008832205B2

(12) United States Patent
Nelson et al.

(10) Patent No.: US 8,832,205 B2
(45) Date of Patent: Sep. 9, 2014

(54) SYSTEM AND METHOD FOR EXTRACTING CALENDAR EVENTS FROM FREE-FORM EMAIL

(75) Inventors: Marie-France Nelson, Los Altos, CA (US); Lee Tannenbaum, Los Altos, CA (US); Debarshi Bhowal, Pune (IN); Mahesh Sharma, Pune (IN)

(73) Assignee: Lextine Software, LLC, Los Altos, CA (US)

( * ) Notice: Subject to any disclaimer, the term of this patent is extended or adjusted under 35 U.S.C. 154(b) by 507 days.

(21) Appl. No.: 12/610,757

(22) Filed: Nov. 2, 2009

(65) Prior Publication Data

US 2011/0106892 A1   May 5, 2011

(51) Int. Cl.
*G06F 15/16* (2006.01)
*G06Q 10/10* (2012.01)

(52) U.S. Cl.
CPC .................................. *G06Q 10/109* (2013.01)
USPC ............ 709/206; 709/203; 709/205; 709/207

(58) Field of Classification Search
CPC ....... H04L 67/04; H04L 67/26; H04L 12/587; H04L 612/5895
USPC .................................. 709/206, 203, 205, 207
See application file for complete search history.

(56) References Cited

U.S. PATENT DOCUMENTS

| | | | | |
|---|---|---|---|---|
| 6,016,478 | A * | 1/2000 | Zhang et al. | 705/9 |
| 2005/0076037 | A1* | 4/2005 | Shen | 707/100 |
| 2006/0293937 | A1* | 12/2006 | Sohm et al. | 705/8 |
| 2007/0244976 | A1* | 10/2007 | Carroll et al. | 709/206 |
| 2009/0235280 | A1 | 9/2009 | Tannier et al. | |
| 2010/0076802 | A1* | 3/2010 | Bhogal et al. | 705/8 |

\* cited by examiner

*Primary Examiner* — Lan-Dai T Truong
(74) *Attorney, Agent, or Firm* — Blakely, Sokoloff, Taylor & Zafman, LLP

(57) ABSTRACT

A system and method are described for automatically detecting calendar events within a free-form email message. For example, a system according to one embodiment of the invention for automatically detecting calendar events within a free-form email message potentially including one or more attachments comprising: a pre-processor to detect one or more keywords within a free-form email message and/or free-form attachments, the keywords indicating whether the free-form email message or free-form attachments contain a calendar event, the pre-processor identifying the free-form email message and/or free-form attachments as potentially containing calendar data upon detecting the one or more keywords; and a natural language processor to further process text from the free-form email message and/or free-form attachments to determine whether the free-form email message and/or free-form attachments contain a calendar event, the natural language processor to parse the email message and/or attachments and evaluate the email message and/or attachments using natural language processing (NLP) techniques to determine the existence of one or more calendar events; and a calendar event generator to extract calendar data from the email message and/or attachments in response to the natural language processor detecting a calendar event, the calendar event generator to update a calendar using the extracted calendar data.

2 Claims, 5 Drawing Sheets

SYSTEM AND METHOD FOR EXTRACTING CALENDAR EVENTS FROM FREE-FORM EMAIL

BACKGROUND

1. Field of the Invention

The invention relates generally to the field of network data processing systems. More particularly, the invention relates to an architecture and method for extracting calendar events from free-form email.

2. Description of Related Art

Parents with kids and especially mothers (a.k.a. working moms or "soccer moms") are today inundated with email messages that contain information related to scheduled events such as sports practice and game schedules, ballet classes, piano lessons, etc. This introduces a time consuming challenge for parents to keep current with all of these email messages. For example, to maintain an up-to-date calendar, parents must open the email messages, open the attached documents, read the email messages/documents and then manually and precisely create each calendar event in the calendaring application of choice.

In addition, many parents do not always have their computer on all the time since they are busy bussing their kids around from one activity to another. Hence, time-urgent email messages with schedule change notifications sometime get missed or read too late.

Furthermore, parents and caretakers sometimes need the same calendar entry so that all stakeholders are aware of the activity. Hence there is a need to create the same calendar entry across multiple calendars.

Currently, Google® provides techniques for scheduling calendar events using Google Mail (Gmail) messages. For example, in some limited circumstances, Gmail is capable of detecting calendar events within an email message and displaying an "add to calendar" link when a calendar event is detected. Upon selecting the "add to calendar" link, the calendar event is added to the Gmail user's calendar.

However, in order for Gmail to properly detect a calendar event, the email message text comply with a strict data format. If the text is not arranged in this specific manner, Gmail will be unable to detect a calendar event. Given the fact that most email messages related to scheduling will not comply with the Gmail format (and, in fact, may include attachments and/or images with scheduling data), the Gmail system will not detect the calendar events in these email messages.

Accordingly, what is needed is a system and method for detecting calendar events in free-form email messages and attachments which do not comply with a predetermined calendaring format.

SUMMARY

A system and method are described for automatically detecting calendar events within a free-form email message. For example, a system according to one embodiment of the invention for automatically detecting calendar events within a free-form email message potentially including one or more attachments comprising: a pre-processor to detect one or more keywords within a free-form email message and/or free-form attachments, the keywords indicating whether the free-form email message or free-form attachments contain a calendar event, the pre-processor identifying the free-form email message and/or free-form attachments as potentially containing calendar data upon detecting the one or more keywords; and a natural language processor to further process text from the free-form email message and/or free-form attachments to determine whether the free-form email message and/or free-form attachments contain a calendar event, the natural language processor to parse the email message and/or attachments and evaluate the email message and/or attachments using natural language processing (NLP) techniques to determine the existence of one or more calendar events; and a calendar event generator to extract calendar data from the email message and/or attachments in response to the natural language processor detecting a calendar event, the calendar event generator to update a calendar using the extracted calendar data.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for extracting calendar events from free-form email. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

One embodiment of the invention automatically detects calendar events within the body and/or attachment of an email message by analyzing the free-form text contained within the email body and/or attachment. In one embodiment, if the scheduling information contained in the body/attachment is not in a text format (e.g., it may be an Adobe PDF, an image, or in a different format), then this embodiment of the invention converts the scheduling information to a text format prior to analysis. It then extracts scheduling information related to the calendar event and responsively updates the user's calendar with the scheduling information.

Figure 1:
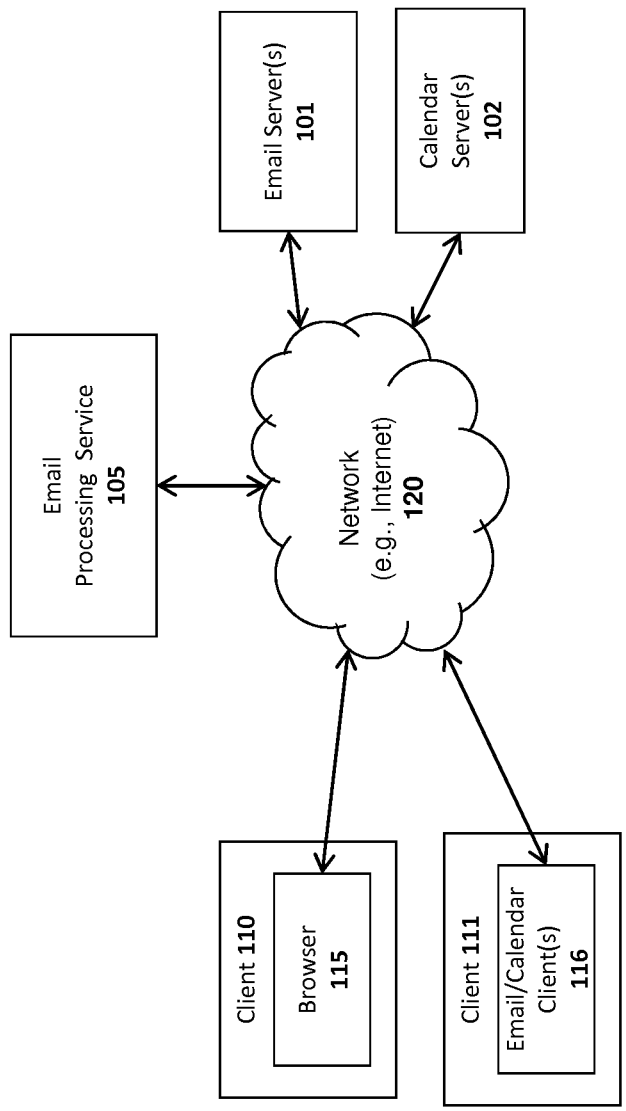
FIG. 1 illustrates a system architecture employed in one embodiment of the invention.

One such embodiment is implemented within a network architecture such as that illustrated in FIG. 1. In this embodiment, an email processing service 105 communicates with email servers 101, calendar servers 102, and one or more clients 110 and 111 to perform the various email processing and calendaring operations described herein. Although illustrated as separate servers in FIG. 1, the email servers 101 and calendar servers 102 may actually be the same server or set of servers. For example, the user may have a singe Yahoo! account for managing both email and calendar data. Alternatively, the user may have a Microsoft Exchange account for managing email and calendar data. The network 120 may be a local area network (LAN) and/or a wide area network (WAN) (e.g., the Internet) or a combination of LAN and WAN network segments. For example, the email server 101 and calendar servers 102 may be located at a corporate LAN and the user may access the email server 101 and calendar server 102 by connecting to the LAN over the Internet (e.g., from home) or directly (e.g., while at work). Moreover, although the email processing service 105 is illustrated as a separate entity in FIG. 1, the hardware and software used for the email processing service 105 may be implemented within the same location as the email servers 101 and/or calendar servers 102. In sum, the underlying principles of the invention are not limited to any particular network configuration.

Regardless of how the overall network is configured, in one embodiment, a user establishes and maintains user accounts on the email servers 101, calendar servers 102, and email processing services 105 using client computers 110 and 111. As indicated in FIG. 1, the user may connect to each of the servers/services via a browser 115 such as Internet Explorer® or Mozilla Firefox® and/or a dedicated email/calendar client 116 such as Microsoft Outlook®. In an example which uses a browser, the email processing service 105, the email servers 101 and calendar servers 102 employ a Web-based front-end to dynamically generate Web pages which are rendered on the browser 115. Various well known functional modules are implemented in this embodiment to receive input, process the input and dynamically generate Web pages containing the results. The Web pages may be formatted according to the well known HyperText Markup Language ("HTML") or Extensible HTML ("XHTML") formats, and may provide navigation to other Web pages via hypertext links. Web pages are requested, dynamically generated, and transmitted from Web servers on the email processing service 105, email servers 101 and calendar servers 102 using the Hypertext Transfer Protocol (HTTP). One embodiment of the invention employs application software written in PHP (a well known scripting language designed for producing dynamic web pages) running on Apache™ Web servers served off Linux platforms. In addition, in one embodiment, the databases described herein are Microsoft SQL databases. It should be noted, however, that the underlying principles of the invention are not limited to any particular type of software platform.

Figure 2:
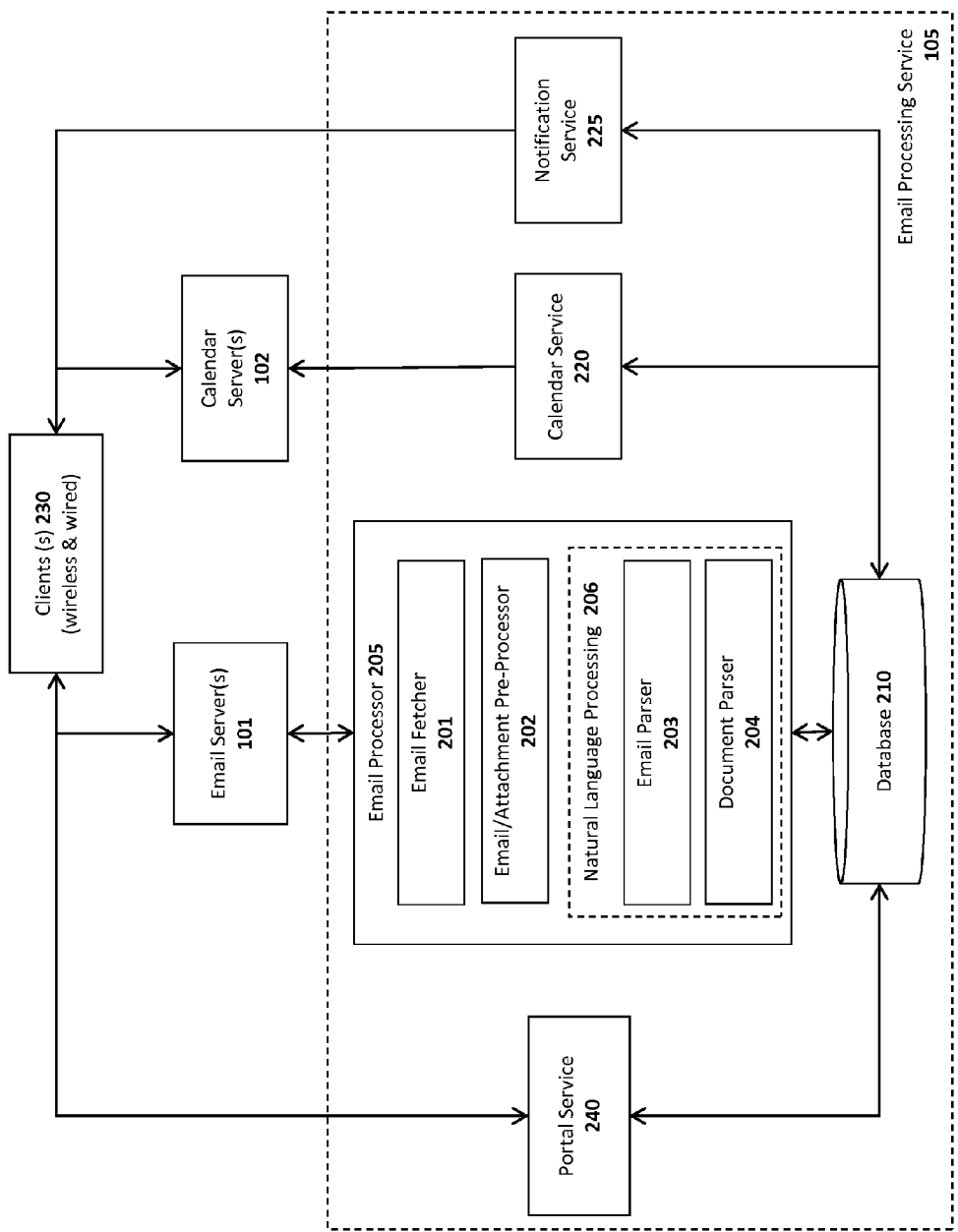
FIG. 2 illustrates one embodiment of a system for detecting calendar events in email messages and responsively updating a calendar.

As illustrated in greater detail in FIG. 2, one embodiment of the email processing service 105 comprises an email processor module 205 for fetching and parsing email messages and attachments (as described in detail below); a calendar service 220 for generating calendar events on the calendar server 102 using calendar data extracted from email messages/attachments; a notification service 225 for generating notifications of new calendar events (which may be sent, for example, to wireless clients); and a portal service 240 to allow user to connect to and configure the email processing service 105 (e.g., via a browser over the Internet). As illustrated, a central database 210 is employed as a central data repository to allow the various system modules to exchange data.

Various components of the email processor module 205 are described in detail below. The email fetcher 201 retrieves email messages from the email server(s) 101 on behalf of the end user and stores the email messages and attachments within the database 210. The email fetcher 201 may be configured to retrieve messages on a periodic basis (e.g., every 5 minutes) and/or the email servers 101 may be configured to automatically push new email messages to the email processor 205. In order to retrieve email, the user must initially provide the email fetcher 201 with authentication information such as a user name and password for the user's account on the email server 101. The email fetcher 201 then logs in to the email server 101 to retrieve email on behalf of the end user.

In one embodiment, the email fetcher 201 initially serializes and flattens the email message and attachment to predetermined text formats and XML formats prior to storing the email and attachment content to the database 210 (as described below). One embodiment of the email fetcher 201 reads Adobe PDF, Microsoft Word®, and Microsoft Excel® documents, extracts text data from these documents, and stores the text data within the database 210. It should be noted, however, that a virtually unlimited number of different document types may be processed by the document fetcher while still complying with the underlying principles of the invention. For example, in one embodiment, the email fetcher 201 comprises program code to process image-based attachments (e.g., JPEG, GIF, TIFF, etc). If the format of the document is not inherently text-based (e.g., a PDF image document or JPEG image), the email fetcher 201 performs optical character recognition (OCR) to convert the document to a text format using various well-known OCR techniques (particularly those techniques suitable for processing table data). Once the text is extracted from email messages and attachments, the email fetcher 201 generates text files within the database 210 containing the extracted information. In addition, in one embodiment, metadata from the email message is stored in an XML file within the database 210.

In one embodiment, the database 210 employs the following directory structure and file formats for storing processing email messages and attachments:

SubscriberId (Directory): This is the primary directory where email messages and attachments are stored for a particular user. The user is identified by a unique subscriber ID code.

Processed (Directory): This directory is located beneath the SubscriberId directory and contains email messages and attachments which have fetched and processed by the email fetcher 201.

Scrubbed (Directory): This directory is located beneath the SubscriberId and contains files for email messages and attachments which do not contain any keywords. As described below, in one embodiment, an email/attachment pre-processor 202 scans the text content from email messages and attachments for keywords and other information.

GUID.xml (File): This file contains the metadata for each email message, stored in an XML format. The GUID is the "global unique identifier" of the email message. A GUID is a special type of identifier used in software applications in order to provide a reference number which is unique in any context. Thus, the GUID uniquely identifies the email.

GUID.txt (File): This file contains the extracted text from the email message.

GUID_IncrNumbr.txt (File): These files contain text extracted from the attachments. The IncrNumbr value is an integer value which is incremented for each attachment (e.g., GUID_1.txt, GUID_2.txt, etc).

In one embodiment the GUID.xml file employs the following schema for storing the email message metadata:

```
<?xml version="1.0" encoding="utf-8"?>
<xs:schema attributeFormDefault="unqualified"
elementFormDefault="qualified" xmlns:xs="http://www.w3.org/2001/
XMLSchema">
<xs:element name="EmailMetadata">
<xs:complexType>
<xs:sequence>
```

-continued

```
<xs:element name="DownloadDate" type="xs:string" />
<xs:element name="SentDate" type="xs:string" />
<xs:element name="EmailTo" type="xs:string" />
<xs:element name="EmailFrom" type="xs:string" />
<xs:element name="EmailCC" type="xs:string" />
<xs:element name="EmailSubject" type="xs:string" />
<xs:element name="Attachments">
<xs:complexType>
<xs:sequence>
<xs:element maxOccurs="unbounded" name="Attachment">
<xs:complexType>
<xs:attribute name="Name" type="xs:string" use="required" />
<xs:attribute name="SerializedAs" type="xs:string" use="required" />
</xs:complexType>
</xs:element>
</xs:sequence>
</xs:complexType>
</xs:element>
</xs:sequence>
<xs:attribute name="ID" type="xs:string" use="required" />
</xs:complexType>
</xs:element>
</xs:schema>
```

The following specific example for an email message which includes three different attachments ("test.doc," "test.xls," and "test.pdf") will be used for the purposes of illustration:

```
<EmailMetadata ID="FAED598A-3EFB-11DE-9C85-F58B56D89593">
<DownloadDate>05/12/09</DownloadDate>
<SentDate>05/12/09</SentDate>
<EmailTo>snarayan@jdstrategies.net</EmailTo>
<EmailFrom>dbhowal@jdstrategies.net</EmailFrom>
<EmailCC>snarayan@jdstrategies.net,dbhowal@jdstrategies.net</EmailCC>
<EmailSubject>This is a test</EmailSubject>
<Attachments>
<Attachment Name="test.doc"
SerializedAs="FAED598A-3EFB-11DE-9C85-F58B56D89593_1.txt"/>
<Attachment Name="test.xls"
SerializedAs="FAED598A-3EFB-11DE-9C85-F58B56D89593_2.txt"/>
<Attachment Name="test.pdf"
SerializedAs="FAED598A-3EFB-11DE-9C85-F58B56D89593_3.txt"/>
</Attachments>
</EmailMetadata>
```

As mentioned above, the GUID.txt file stores the actual content of the email body. The extension of the attachments will initially be maintained as the email fetcher 201 stores the files to the database 210. The names of the attachments to the email will have an incremental number appended to the GUID. In this example, the three attachments will be named GUID_1.doc; GUID_2.xls; and GUID_3.pdf.

After serializing the files, the email fetcher 201 parses the contents from the different types of attachment and creates text files: GUID_1.txt; GUID_2.txt; and GUID_3.txt. The text files are then processed by the email/attachment pre-processor 202 and the natural language processing (NLP) engine 206 as described below. The NLP engine 206 includes an email parser component 203 and a document parser component 204 for processing email messages and attachments, respectively. In one embodiment, following creation of the text files, the actual attachments are deleted from the database 210.

The email/attachment pre-processor 202 initially reads the text files to detect the existence of keywords prior to passing analysis to the natural language processing functions of the NLP engine 206. Specifically, in one embodiment, the email/attachment pre-processor 202 searches for specified sets of keywords to determine if the email message contains calendar events. In one embodiment, the keywords are specified by the end user. For example, if a user's child is actively participating on a tennis team at the Courtside Club, then the user may specify that any email messages which include the keywords "Courtside" and "tennis" should be analyzed by the NLP engine 206 for calendar events. When the email/attachment pre-processor 202 detects the existence of the "Courtside" and "tennis" keywords in an email message (or attachment), it automatically passes the email message content (including attachments) to the NLP processor 206 for natural language processing.

In one embodiment, if one or more keywords are not detected within an email message or associated attachments, the email/attachment pre-processor moves the files associated with that email message to the "Scrubbed" directory within the database 210.

In one embodiment, the email parser 203 reads the email message content stored as GUID.txt on the database 210, parses and analyzes the content to determine whether the message contains one or more calendar events. Similarly, the document parser 204 reads the attachment content stored as GUID_IncrNumbr.txt on the database 210, parses and analyzes the content to determine whether the attachment contains calendar events. Unless otherwise specified, the description below related to the operation of the NLP module 206 applies to both the operation of the email parser 203 and the document parser 204.

Once a calendar event is detected by the NLP module 206, the calendar data is extracted by the calendar service 220, which updates the user's calendar on the calendar server 102. To do so, the calendar service 220 logs into the calendar server(s) 102 with user authentication data (e.g., user name and password) and establishes a new calendar entry by communicating with the calendar server 102 using known calendar protocols. For example, if the calendar server 102 is a Microsoft Exchange server, then the calendar service 220 may communicate with the server 102 as a Microsoft Outlook client.

Prior to a detailed description of the NLP module 206 and calendar service 220, a method according to one embodiment of the invention will be described with respect to FIGS. 3-4. In one embodiment, the method is implemented on the system architecture shown in FIG. 2. It should be noted, however, that the method illustrated in FIGS. 3-4 is not limited to any particular hardware and/or software configuration.

Figure 3:
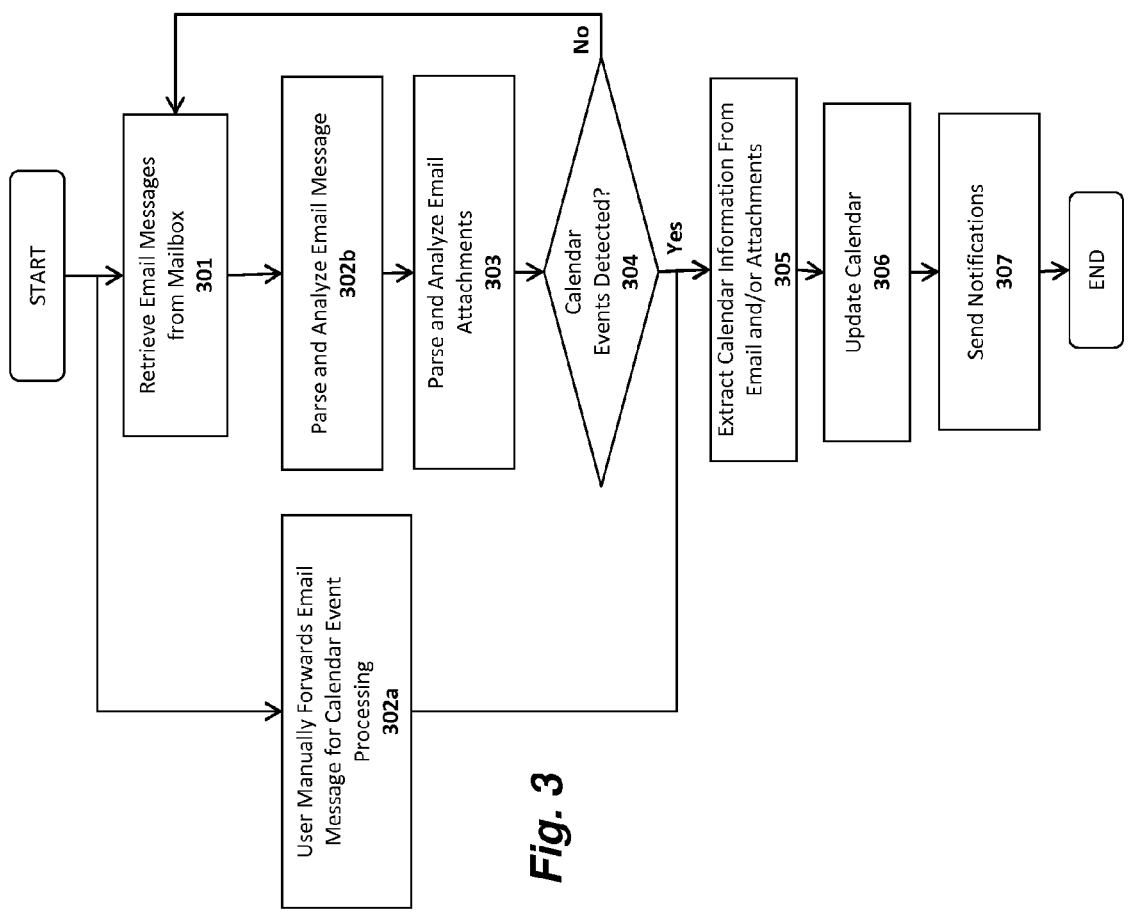
FIG. 3 illustrates a method according to one embodiment of the invention for detecting calendar events in email messages and responsively updating a calendar.
Figure 4:
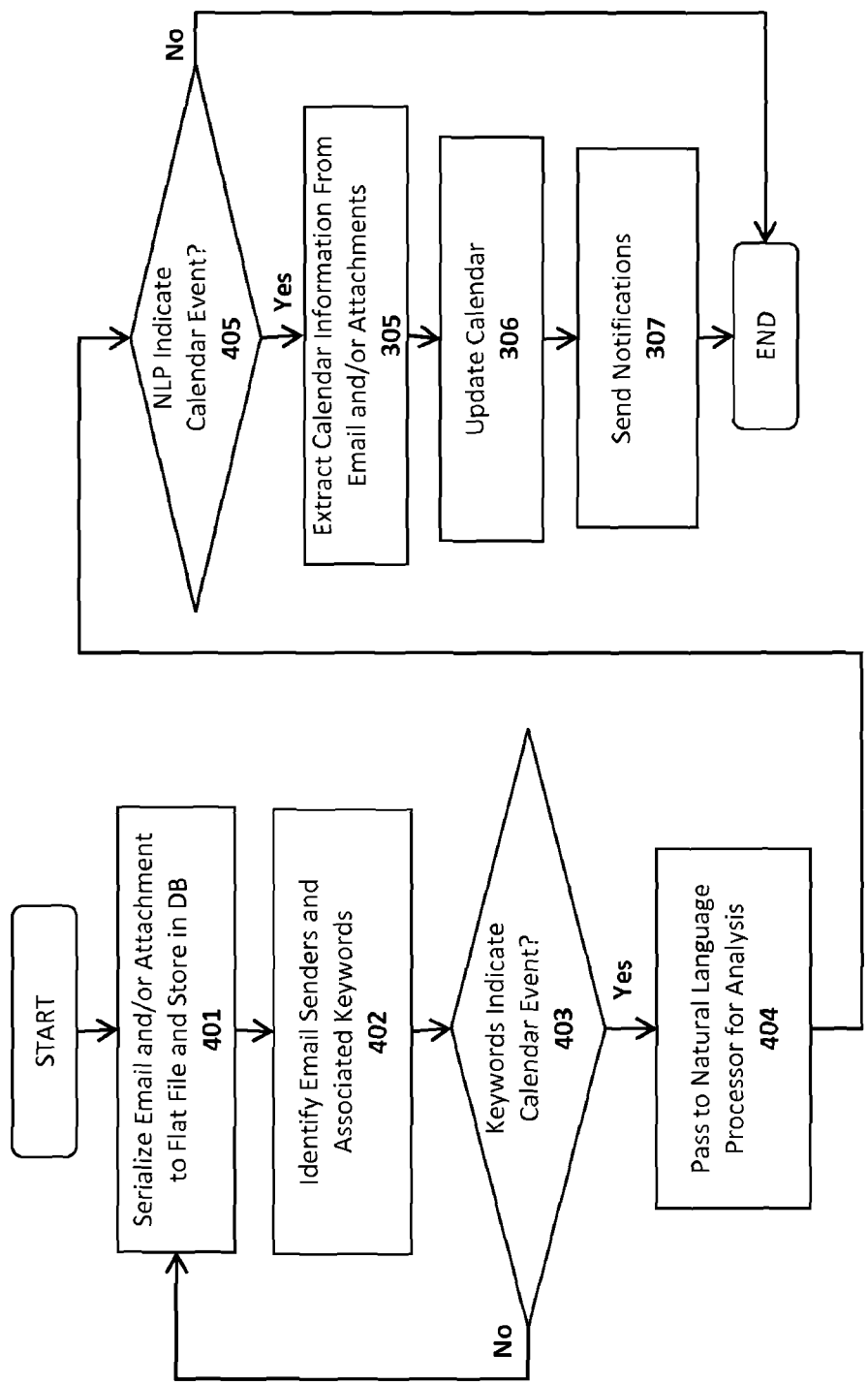
FIG. 4 illustrates a method according to one embodiment which uses keywords and natural language processing techniques.

Turning now to FIG. 3, at 301, email messages are retrieved from the user's mailbox on behalf of the user. As mentioned above, in one embodiment, the user provides the email processing service 105 with authentication data so that the email processing service 105 can access the user's mailbox. Alternatively, or in addition, at 302a, the user may choose to manually forward one or more email messages to a designated destination for calendar event processing (thereby bypassing the automated steps of 301, 302b, 303 and 304 which automatically retrieve email and detect calendar events). In one embodiment, the email is forwarded to email address specified by the email processing service 105.

If the user chooses to have the email processing service 105 determine if an email message contains a calendar event then, at 302b and 303, the email processing system parses and analyzes the email message and the attachments, respectively. Various details related to each of these steps are described herein. If a calendar event is detected, determined at 304, or if the user has manually forwarded an email message for calendaring at 302a, then at 305, the email processing service extracts the calendar information from the email and/or attachments using the various techniques described herein. At

306, the email processing service updates the user's calendar and, at 307, sends notifications of the calendar update to the end user. For example, as illustrated in FIG. 2, one embodiment of the email processing service 105 includes a notification service 225 to transmit an SMS message, instant message (IM), or email message to notify the user of each new calendar event and/or calendar update.

FIG. 4 illustrates additional details associated with parsing and analyzing email messages to detect calendar events (e.g., steps 302b, 303 and 304 in FIG. 3). At 401, after an email message is retrieved from the user's mailbox, the email message and any attachments are serialized and stored as text-based flat files within a database (i.e., text files and XML files as described above). At 402, the text-based files are parsed to identify email senders and keywords. As mentioned above, user's may specify certain keywords to identify calendar events. In addition, in one embodiment, the user may identify certain senders and associate those senders with certain keywords. Returning to the above example, the user may identify "Courtside" and "tennis" as two required keywords and may identify "courtside-club@courtside.com" as a required sender. Thus, in this embodiment, the email message will not be passed on for further analysis unless both the sender and one or more associated keywords are identified within the email message.

At 403, if a user-specified sender and/or keyword indicates that the email message is a calendar event then, at 404, the email/attachment content is passed to the NLP engine 206 for further analysis. A detailed description of the NLP engine 206 is provided below. At 405, if the NLP determines that the email message or attachment contains a calendar event, then the process returns to step 305 (described above) where the calendar data is extracted from the email message and, at 306, the user's calendar is updated.

Figure 5:
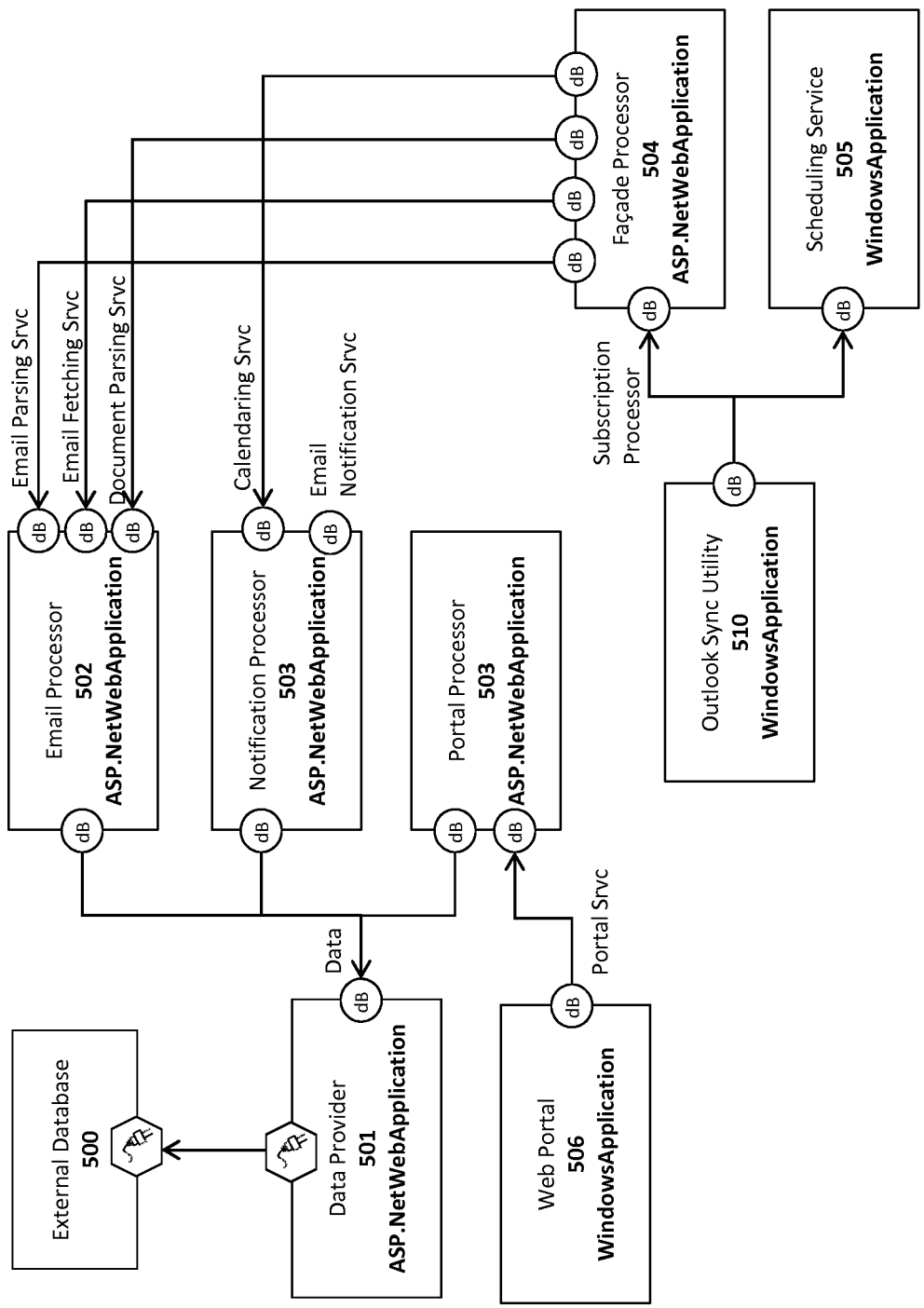
FIG. 5 illustrates an object model showing interactions between system components according to one embodiment of the invention.

FIG. 5 illustrates an object model representation of one embodiment of the email processing service 105. As illustrated the object model comprises a database 500 which is accessible via a data provider module 501. The database is a central repository for the data files described herein. In one embodiment, data exchanges between the various other system components occurs via the database 500. In one embodiment, the database 500 is a Microsoft SQL database; however, various other database types may be employed (e.g., MySQL).

In one embodiment, the data provider module 501 is an ASP .Net website that will host the Data services and expose the database 500 through RESTful APIs. All data access will be done through the Data service. In one embodiment, the data provider implements a caching layer between the database and the Data service to improve performance and reduce the load on the database 500. The Data service will check the cache for the relevant data before hitting the database.

The email processor 502 is an ASP .Net website that will host the email fetching service, email parsing service, and document parsing service. The email fetching service exposes all of the functionality required for downloading emails from a POP3/IMAP mail server. The email parsing service exposes all of the functionality for parsing an email and its attachment. The document parsing service exposes all the functionality for parsing documents (e.g., email attachments) as described herein. The parsing engine employed within the system is shared by email parsing service and document parsing service.

The notification processor 503 is an ASP .Net website that will host the calendering service for generating new calendar events using information extracted from email messages and attachments as described herein. This service will expose all the functionality required for inserting calendar events into a specified calendar database. The email notification service generates SMS, MMS, IM, and/or email notifications in response to calendar events.

The web portal 506 is an ASP .Net website which will expose all the web pages required for user registration, account configuration etc. As mentioned above, users may log in to the website via a standard browser such as Internet Explorer or Mozilla Firefox.

The portal processor 503 is an ASP .Net website that will expose the portal service. The portal service exposes all the business logic, validation etc. required by the web pages of the web portal.

The façade processor 504 is an ASP .Net website that will expose the subscription processor—a service that acts as a facade to all the web services mentioned above. Given a unique subscriber ID, it orchestrates between all of the other web services and processes user data transactions from end to end. In one embodiment, it employs a state machine for implementing the various operations described herein. In one embodiment, the state transition matrix is captured in XML so that it can be changed without any requirement for code change.

The outlook sync utility 510 is a windows application employed in one embodiment of the invention that the user downloads from the web portal 506 and installs locally on his/her client computer. This application communicates with the subscription processor, for retrieving calendar events and posting them to the Outlook 2003/2007 instance running in the same computer. This implementation is used, for example, for stand-alone calendar implementations (i.e., where the user manages a calendar locally rather than from server).

The scheduling service 505 is a windows service that continuously monitors the synchronization schedules for users and puts them in the relevant hourly queue for further processing. As soon as an element is available in the current hourly queue, it will be removed from the queue and submitted to the subscription processor.

In one embodiment, the NLP engine 206 on the email processing service 105 employs machine learning techniques to identify calendar events. In one embodiment, the NLP engine 206 performs the following basic operations:

1. Recognize the presence of a calendar event and the type of calendar event. In one embodiment, the basic event type is a new calendar event (<Schedule>). Other types of calendar events include a change to an existing calendar event (<Reschedule>), deletion of an existing calendar event (<Cancel>), and/or a change to the calendar event location (<Change Location>).

2. Recognize the number of calendar events per email and process accordingly. For <Schedule>, assign appropriate text to each slot in a new calendar event template. For <Reschedule>, either modify the start date/time in an existing calendar or do a combination of deleting an existing calendar entry and creating a new calendar entry. For a <Cancel> event, either do a soft or hard delete of a calendar event.

3. Parse out the data for the calendar event. Here the NLP engine recognizes and processes statements that modify a basic slot assignment of a new calendar event within the body or attachment of an email.

In one embodiment, the sentence (<Sentence>) is the basic unit of analysis for all text processing by the NLP engine 206. For example, in one embodiment, for the machine learning tasks discussed herein, it is a <Sentence> that is changed into a vector of features. A <Sentence> need not be grammatically correct to be included within any classification task.

An approach employed in one embodiment of the invention is to combine machine learning and rules to arrive at the highest level of classification accuracy across all of the tasks described below. The following general design configuration is employed in one embodiment of the invention:

1. In one embodiment, Support Vector Machines ("SVM") is used for the machine learning classification employed within the NLP engine 206. SVM is a well known set of supervised learning functions used for classification and regression. Of course, the NLP engine 206 may employ other types of natural language processing such as SharpNLP (based on MaxEnt), although SVM will, in general, produce better results. In one embodiment, SharpNLP is used for intermediate tasks and to supply features to the SVM. Multi-Class classification may employ other algorithms to improve results, such as MultiNomial Bayesian Classification.

2. In one embodiment, the open source toolkit used for machine learning is Weka coupled with SharpNLP. As is known in the art, Weka is a collection of machine learning algorithms for data mining tasks. SharpNLP is a well known collection of natural language processing tools written in C#.

3. In one embodiment, various tasks and ancillary tasks are aided by the use of an open source rule engine such as the Simple Rule Engine (SRE) and nxBRE (an open-source rule engine for the .NET platform).

4. In one embodiment, Wordnet is used to supply features to inferencing rules implemented by the rule engine and potentially to machine learning algorithms as well. WordNet is a lexical database which groups English words into sets of synonyms called "synsets," provides short, basic definitions, and records different semantic relationships between these synonym sets. As is known in the art, one purpose of Wordnet is to support automatic text analysis and artificial intelligence applications.

The operations performed by the NLP engine are grouped into a series of NLP tasks. Each NLP task described below assumes the preprocessing of sentences including splitting, tokenization, lowercasing, stemming, chunking, and possibly some linguistic parsing. In one embodiment, these well known operations are performed by the email/attachment pre-processor 202 and/or SharpNLP. Named entity recognition and coreference resolution are other sentence level tasks to be used either pre-classification or post-classification. In one embodiment, this functionality will be supplied by Sharp-NLP. Alternatively, in one embodiment, Weka will provide support for these functions as well.

Classification of text using machine learning algorithms requires that the text be transformed into a vector of features. It is these features which are used to both train a machine learning model and classify with the model. The choice of features is one of the chief determinants of the success of any machine learning application:

1. In one embodiment, a Weka filter creates text features including either the presence or absence of a word in a sentence, or a count of how often a word appears in a sentence. The Weka filter can be told to ignore stopwords among many other parameter settings. This word presence/count feature has shown to be powerful predictor of event extraction using SVM.

2. In one embodiment, some features are generated from SharpNLP. For example, the part-of-speech (POS) of a word (as used within a sentence) may be a feature, as may the chunking structure of a sentence.

3. In one embodiment, some features are generated from Wordnet. For example, Wordnet may be used to generate the synonyms or hyponyms of a word and use them as features.

4. Other features may include one or more of the following: (a) the position of a sentence with the text; (b) the length of the sentence; (c) a look-ahead feature which determines if the "next" sentence is event related; (d) a look-behind feature which determines if the "previous" sentence is event-related; (e) whether a sentence contains negatives; (f) whether a sentence contains modals. The foregoing are merely examples used for the purpose of illustration. Various other features may be employed while still complying with the underlying principles of the invention.

In one embodiment, the following tasks are executed by the NLP engine using the described system components:

A. Task #1 Recognition of Schedule Events

The goal of this task is to detect if an email message includes a calendar event. Sentences (grammatical and otherwise) are feature-vectorized and associated with a <Schedule> event (if a calendar event exists) or a <NoSchedule> event (if a calendar event does not exist). As mentioned above, in one embodiment of the invention, SVM (Support Vector Machines) are used for the classifier. This task is used as a first-pass screener to determine which emails require more extensive processing.

The prominent features employed by this task include:

1. Word frequency or word presence. The word frequency/presence may be constrained in many ways such as requiring that it appear at least some minimum number of times within the training corpus to be allowed as a feature.

2. POS (comes from SharpNLP parser which is based on MaxEnt)

3. Chunks (comes from SharpNLP parser which is based on MaxEnt)

Additional features which may be evaluated in one embodiment of the invention include:

1. The position of the sentence within email
2. The length of the sentence
3. The presence of modal words in the sentence
4. The presence of "Negative" words in the sentence In one embodiment of the invention, the inference engine will be used to supplement this task. It will help fill in gaps missed by the SVM classifier, though it will in itself be a strong classifier. The prominent features, enabled by Wordnet, include the processing and identification of synonyms and hyponyms (is a type of relationship). The list of synonyms and/or hyponyms for words yields a "trigger list". If a sentence contains one or more words from the trigger list for an event type, then the sentence should be classified as that event type By way of example, and not limitation <Meet> is a synonym for <Schedule>, so a sentence containing any form of <Meet> should be classified as a <Schedule> event.

Of course, in one embodiment, the support vector classifier will pick up on this as well by having already seen sentences with <Meet> and being told during training that they are part of a <Schedule> event. However, not all synonyms or hyponyms for <Schedule> will be encountered in the training data, so the addition of inferencing rules as described above will help improve classification accuracy for this task.

By the same token, not all uses of a given word should be associated with an event. This is why, in one embodiment, the SVM classifier is executed first. Then the rules-based components described herein are used to fill in gaps.

By way of example, the sentence:

"John came in first at the track meet" should not be classified as a <Schedule> because "meet" is being used as part of a co-location <track meet>.

As another example, the sentence:

"Our plan is right on schedule" has the word <schedule> in the sentence, but the email should not be classified as triggering a <Schedule> event because of the use of the word (based solely on this sentence).

A1. Sub-Task #1A—Recognition of Multiple Events at the Same Time

The strategy for multiple concurrent events is similar to that for Task 1 described above. Instead of training the classifier for a binary <Schedule> vs. <NoSchedule> classification, in one embodiment, it is trained to recognize multiple class values: <Schedule>; <Reschedule>; and <Cancel>.

In one embodiment, SVM will be used for these multi-class techniques. However, other techniques may also be used including multinomial Bayesian classification. Once again, in one embodiment, Wordnet in conjunction with inferencing rules will be used to provide assistance in this context.

B. Task #2—Recognition of how Many of Each Event Type are Referred to within an Email Any given email may have multiple events of the same type; for example, many <Schedule> events may be alluded to within the email body. In one embodiment, the classifier is trained to recognize these numbers as "events" and then use CoReference resolution provided by, for example, the CoRef tool in SharpNLP to determine which sentences refer to which event of the given type.

C. Task #3—Create, Modify, or Delete Calendar Templates

It is important to identify each event type, and for each event of a given type within an email, perform the correct action (i.e., create a new calendar entry, modify an existing entry or delete a calendar entry). One embodiment of the invention distinguishes between templates, which are intermediate structures representing CalendarEvents, and the CalendarEvents themselves.

In one embodiment, the strategy is to produce a template, filled with text, which is then fed into a CalendarEvent instantiator. Alternatively, the NLP engine 206 may construct the CalendarEvents directly.

<Schedule> creates a new calendar template/event with appropriate values.

<ReSchedule> modifies the StartTime and dates associated with an already-created CalendarEvent. A unique identification code is used to associate the <Reschedule> event within the email message with some particular CalendarEvent that already exists.

<Cancel> is a soft or hard delete of an already existing CalendarEvent. This requires an identification code for event/template correspondence.

<Modify> takes a template that has not been committed to an actual CalendarEvent instance and performs a modification of some slot value (e.g., subtract 45 minutes from the already-filled-in start time).

D. Task #4—Process Modification Statements

Some email messages contain statements that modify calendar template slots that have just been (or are about to be) created. For example, "Please arrive 45 minutes before the regularly-scheduled time" is a directive to modify the <StartTime> slot of a newly-created calendar template (whose existence may have been triggered by previous sentences in the email). This situation should not be treated as a <ReSchedule> because it does not refer to a previously-created CalendarEvent.

One approach is to train the classifier to recognize modifications statements such as these, translate them into mathematical or other transformations, and "apply" them to the already existing values in those template slots.

Prominent Features include one or more of the following:
1. Sentence Mood
2. Sentence Tense
3. Named Entities as determined by the SharpNLP named entity extractor (e.g., <Time> or <Location>).

E. Ancillary Task #1—Recognize Tables that Refer to Calendar

Tables may be used to convey a large series of calendar events. Many email messages that are schedule-related contain textual versions of tables that (typically) <Schedule> new calendar events en masse. One embodiment of the NLP engine 206 is configured to recognize and process these tables. Often, these tables are preceded by a one-line header identifying columns within the textual table, much as is done within comma-separated-value files. The presence of this header is a strong feature for table identification, though it is clearly possible to have textual tables that don't have the one-line header.

In addition, the header and table body frequently have tabs separating the column values, another strong feature for table identification. Semantically, since the tables have to do with <Scheduling> calendar events, a Named Entity extraction module extracts the following tags within the table:

<Event>
<Date>
<Time>
<Location>

All on the same physical email line (and therefore within the same sentence as determined by the MaxEnt sentence splitter). Again, this processing results in a "feature" that is highly diagnostic of table presence, but merely diagnostic—it is possible for a table to not be packaged so neatly as contiguous physical rows within the email.

In one embodiment, the beginning and the end of a table is recognized and the table is marked as a block, to be treated as a separate entity. Then, within the table body, the individual calendar events are marked along with the text for filling template slots. In practice, the processing may proceed from inside out, first identifying the low-level slots, then the events, then the entire table body. Alternatively, the processing may proceed from both directions at once.

As with other NLP tasks, this is implemented with a combination of machine learning and rules-based inferencing to help with table recognition. Since this is a binary task, SVM is a likely candidate for the machine learning portion.

F. Ancillary Task #2—Incorporate/Leverage Mail Meta-Data

As mentioned above, each email message to be processed by the NLP engine 206 is accompanied by an XML file containing email metadata such as email header information. The metadata represents a summary of the sender "situation context"—things that describe the context surrounding the sending of the email. In one embodiment, this information is used by the NLP engine 206 when processing email.

For example, an email subject metadata "Schedule for next week's practices" clearly indicates that the email message contains schedule information. Thus, the NLP engine 206 may automatically consider this email to be schedule related and bypass Task 1. On the other hand, it is possible for the metadata to be misleading, at least as far as NLP is concerned. The very same email whose subject line contains "Schedule for next weeks practices" may not contain a new schedule but simply a commentary on an already existing schedule (or it may contain a <ReSchedule>, etc). Consequently, the use of metadata is, as with table recognition features, diagnostic but not conclusive—it is one source of evidence that is to be used for all classification tasks.

Interestingly, the leveraging of mail meta-data may be one task in which rule-based inferencing outshines machine learning classification, for the just-mentioned reason of 50-50 diagnosticity and for the reason that rules may be more easily specified for this task than for any of the other NLP tasks.

G. Ancillary Task #3—Incorporate/Leverage Keywords

Keywords have a special role within the email processor 205, being used (as described above) by an email/attachment pre-processor 202 to infer that an email is schedule related. Such email messages would are sent to the NLP engine 206 for further processing (i.e., to determined how many calendar events, to assign text to template slots, etc). However, keywords may also be used by the NLP engine 206 directly:

1. As the opposite of a "Stop List." Stop Lists are used in one embodiment of the invention to tell the NLP engine to ignore certain everyday words and not use them as the basis of classification features. In contrast, keywords can be used in the NLP engine 206 to form an "Include List," or a list which identifies words that, if present within an email, SHOULD be used as the basis of classification features.

2. As part of an email summarization module. In one embodiment, keywords are compared to Wordnet features, using this similarity to help determine the most important sentences within the email. The "important" sentences in this embodiment would become the email summary.

H. Ancillary Task 4—Process Input and Output

The NLP document parser 204 primarily uses files produced by the email fetcher 201 and email/attachment pre-processor 202. The result of this processing provides the input for runtime classification of emails and attachments. In one embodiment, all ".txt" files are processed by the document parser 204. In turn, the output from the NLP engine 206 is a structure corresponding to the CalendarEvent class (either the class itself or something which feeds it). The process leading to this output is described above in Tasks 1-3.

For each .txt file, each sentence is read on a sentence by sentence basis. Each sentence is feature-vectorized and then classified, using a previously-trained machine learning model. There are two alternate embodiments at this stage (which assume use of Weka as the machine learning tool):

1. Convert the .txt file to an .arff on disk, feature-vectorize the email body attribute, and then read the entire file on a sentence-by-sentence basis and classify each sentence.

2. Read in the original .txt file, break it into sentences (e.g., using the SharpNLP sentence splitter), convert all sentences to .arff format in memory, feature-vectorize the sentences, and then classify each feature-vectorized sentence (as an instance within Weka).

Again, the above discussion pertains to runtime classification of emails. By contrast, training of a machine learning model is typically done offline. However, in one embodiment, methods are built for doing this within the document parser 204. The Training module can read pre-packaged .arff files.

As described above, each email has an associated .XML file which captures the email meta-data in a special format. This does not necessarily mean that the meta-data has been stripped out from the email body .txt file. This raises design issues:

1. If some portion of the meta-data remains (as text) within the email body file, it may simply be treated as text and classified. The metadata fields may also be parsed out and used as features for classification.

2. Some email messages have multiple meta-data pieces (again as text) within them, perhaps reflecting the presence of an email thread. Which meta-data then to use for classification (this issue also pertains to training unless we manually strip out the text meta-data from each email body text file.

The fields within the meta-data have a particular structure that perhaps should be parsed in way similar to table recognition within the body of an email.

I. Ancillary Task #5 Process Forwards, Threads, Appropriately

Some emails are part of a thread, either via "Forwarding" or other mechanisms. In one embodiment, the critical portions of these email messages are identified and process while the remaining portions are ignored. In one embodiment, the "critical" portion comprises the latest portion of the thread, but various other portions may be used (e.g., the last two thread responses).

J. Ancillary Task #6 CoReference Resolution

An important part of multiple-event classification and template filling is CoReference resolution, in which multiple sentences that refer to the same event are identified. In one embodiment, CoReference resolution is performed by the email/attachment pre-processor 202 prior to the NLP engine 206. Alternatively, or in addition, CoReference resolution may be performed during execution of the larger classification tasks within the NLP engine 206 and not simply as part of pre-processing by the email/attachment pre-processor 202.

SharpNLP provides a CoReference tool which forms the basis of the CoReference module used in one embodiment of the invention. While useful, there is error in its decisions, mostly in the form of failing to tag sentences that are CoReferences. This module must therefore be improved for the present implementation. In one embodiment, the types of errors made by the SharpNLP CoReference tool are identified and categorized. SharpNLP is either retrained or combined with another separate CoReference tool (perhaps through Boosting or similar techniques). In one embodiment, when in doubt (i.e., when a clear co-reference resolution is not possible), the two or more sentences are treated as referring to separate events.

K. Ancillary Task #7 Handling Costs of Classification Errors

A standard issue within data mining is the cost associated with classification errors. For the present invention, this issue comes down to whether failing to recognize that an email is calendar related (a "Miss") is a better/worse result than falsely deciding that an email is related to calendar events ("False Alarm"). The more aggressively events are calendared (i.e., the more sensitive the email processor is to detecting calendar events), the more likely false alarms may result. By contrast, the less aggressively events are calendared, resulting in a higher percentage of "misses," the less likely false alarms will result. One embodiment of the invention allows the user to specify how aggressively the email processor 205 identifies calendar events within email messages (e.g., on a scale from 1-5 with 1 being the least aggressive and 5 being the most aggressive). The user preference is provided to the NLP engine 206 and fed into the machine learning algorithms. In one embodiment, the default mode of operation of the NLP engine is to aggressively calendar events (i.e., from the NLP engine's point of view, the cost of missing a true calendar event email is worse than scheduling one that truly does not exist).

In one embodiment, a "slider" control is configured within a graphical user interface. Each user can then choose where on the false alarm/miss continuum they feel comfortable. Weka allows a "cost matrix" to be input into its classification schemes, thereby forcing its algorithms to be more sensitive to those errors that the user is most sensitive to.

L. Ancillary Task #8 Spell Checking

In one embodiment, a spell checking library is included within the NLP module 206 to ensure that feature vectors are not littered with misspelled words at classification time (runtime). In one embodiment, the spell checker is executed as part of a general pre-classification process by the email/attachment pre-processor 202.

Throughout the discussion above, various details have been omitted to avoid obscuring the pertinent aspects of the invention. For example, in an embodiment of the invention in which the user connects to the email processing service 105 via a Web browser, various well known functional modules are implemented to receive input, process the input and dynamically generate Web pages containing the results. The Web pages may be formatted according to the well known HyperText Markup Language ("HTML") or Extensible HTML ("XHTML") formats, and may provide navigation to other Web pages via hypertext links. Web pages are requested, dynamically generated, and transmitted from Web servers on the online stationery service 300 using the Hypertext Transfer Protocol (HTTP). One embodiment of the invention employs application software written in PHP (a well known scripting language designed for producing dynamic web pages) running on Apache™ Web servers served off Linux platforms. In addition, in one embodiment, the databases described herein are Microsoft SQL databases. It should be noted, however, that the underlying principles of the invention are not limited to any particular type of communications protocol or network architecture.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules such as wizards and other logic may be implemented as software, hardware or any combination thereof. Accordingly, the scope and spirit of the invention should be judged in terms of the claims which follow.

What is claimed is:

1. A system comprising:
a memory to store instructions;
a processor configured to execute the instructions causes the system to automatically detect calendar events included within a free-form email message that potentially including one or more free-form attachments;
an email processor component generated by software program code executed by the processor, the email processor component having:
an email fetcher configured to fetch email messages from an email server;
an email/and attachment pre-processor configured to detect one or more keywords within a free-form email message and free-form attachments;
wherein the keywords indicate whether the free-form email message or free-form attachments contain a calendar event, and a pre-processor identifies the free-form email message or free-form attachments as potentially containing calendar data upon detecting the one or more keywords; and
a natural language processing component configured to parse the free-form email messages and free-form attachments to identify calendar events from detected keywords, the natural language processing component processing text from detected keywords which contain calendar events by implementing processes of parsing the free-form email message and free form attachments to detect keywords indicating calendar events and evaluating the free form email message and free form attachments using natural language processing (NLP) techniques to determine the existence of one or more calendar events, wherein the natural language processing (NLP) techniques use the text and other data formats to determine calendar events from the free-form email message and the free-form attachments; and
a calendar event generator configured to extract calendar data in response to the step of detecting a calendar event from the natural language processing component, generating calendar entries from the extracted calendar data, and update a calendar with the generated calendar entries;
wherein the free-form email comprises a message entered by a sender without regard to a predefined structural format and potentially including one or more free-form attachments text and other data formats; and wherein the free-form email and free-form attachments are formed in text form and other data formats which are not arranged according to a predefined structural format;
a notification service generated by software program code executed by the processor, the notification service generating and transmitting notifications of new or updated calendar events generated by the calendar service.

2. The system as in claim 1 wherein notifications are transmitted via email and SMS messages.

* * * * *